United States Patent [19]

Carter

[11] Patent Number: 4,664,146

[45] Date of Patent: May 12, 1987

[54] COMBINATION ECONOMIZER VALVE AND LOCKING MEANS FOR OXYGEN SUPPLY SYSTEM

[75] Inventor: William Carter, Indianapolis, Ind.

[73] Assignee: Ray V. Bussell, Indianapolis, Ind.

[21] Appl. No.: 897,513

[22] Filed: Aug. 18, 1986

Related U.S. Application Data

[63] Continuation-in-part of Ser. No. 855,738, Apr. 25, 1986.

[51] Int. Cl.[4] .................................... G05D 7/06

[52] U.S. Cl. .................................... 137/599; 137/613; 137/510

[58] Field of Search .................................... 137/599, 613

[56] References Cited

U.S. PATENT DOCUMENTS

| | | | |
|---|---|---|---|
| 1,630,741 | 5/1927 | Griffiths | 137/599 |
| 1,697,865 | 1/1929 | Hahn | 137/599 |
| 3,152,589 | 10/1964 | Kugler | 128/201.21 |
| 4,140,297 | 2/1979 | Bussell | 251/90 |
| 4,142,523 | 3/1979 | Stegeman | 137/613 X |

*Primary Examiner*—Harold W. Weakley

*Attorney, Agent, or Firm*—Robert A. Spray

[57] ABSTRACT

A combination device for flow-regulation in an oxygen supply system, providing in a unitary device providing both an economizer valve which automatically and safely vents oxygen when the patient's demand or usage is less than the amount being constantly produced by the heat-induced evaporation (NER) of liquid oxygen in a supply reservoir, but automatically and economically stops the venting when the usage demand utilizes at least as much as the NER, in combination with a lockable flow-regulating oxygen-supply valve which can be pre-set to permit only a certain maximum flow rate of the oxygen although permitting the flow to be moderated to less than that maximum flow rate, thus giving an oxygen-therapy patient some control of oxygen flow-rate although preventing overdose.

3 Claims, 8 Drawing Figures

COMBINATION ECONOMIZER VALVE AND LOCKING MEANS FOR OXYGEN SUPPLY SYSTEM

RELATION TO CURRENTLY-PENDING CASE (This invention is a continuation-in-part of the pending U. S. patent application Ser. No. 06/855,738, titled "Economizer/Relief Valve for Oxygen Dispensing System", filed Apr. 25, 1986, by this same inventor.)

FIELD AND BACKGROUND OF THE INVENTION AS A COMBINATION

The present invention is that of a combination which achieves in a unitary device various flow-regulating effects in an oxygen-supply system, primarily that of a system for medical use in an oxygen-therapy program for a patient, although other utilization may also be served, in the dispensing of gas dispensing from a cryogenic liquid storage system.

More particularly, the present invention provides a combination of concepts which in their combination achieve both an automatic venting and non-venting, according to the patient's usage of oxygen at any particular time, automatically providing both safety-venting but also economical non-venting according to the patient's usage of the gaseous oxygen from the liquified oxygen storage reservoir, yet also providing a regulated flow to the patient to conform to a maximum flow-rate prescribed as maximum for the patient yet also permitting a downward adjustment of the flow-rate by the patient; and, regardless of the patient's adjustment of the flow rate, the safety venting or economical non-venting acts automatically according to that usage and to the gas evaporation as heat enters the cryogenic liquid supply reservoir.

The nature and effects of the invention of the novel combination here achieved can perhaps be easiest understood by a summary of problems or factors of a cryogenic supply system, particularly that of dispensing of oxygen (in gaseous state, of course) to a patient undergoing a therapy in which oxygen is being administered. Some of the factors are already quite apparent, but they are included anyway, as having an effect on the overall accomplishments achieved by the novel combination, especially since from the prior art basic components of the combination are here not only conceded as used but are emphasized:

1. The storage of the oxygen is in an extremely cold (cryogenic) liquid state.

2. Ambient heat entering the storage reservoir causes a continuing boil-off or evaporation (often called the Normal Evaporation Rate, or simple "NER") of the stored oxygen.

3. The oxygen from the storage reservoir is used by the patient in a gaseous state, and given additional warming from that of the temperature of the gaseous oxygen in the reservoir zone (called the "ullage") of the oxygen gas above the liquid oxygen in the storage reservoir.

4. The NER is constantly present, even though it changes somewhat in magnitude according to such factors as room-heat (ambient temperature), proportion of the reservoir container having liquid oxygen in contrast to the ullage region, added warm-up to the gaseous oxygen in the dispensing lines, etc.

5. The patient's demand for oxygen is not always constant, due to differences in activity or other matters of the patient's real or imagined needs, this factor having become increasingly important in recent years due to more "at home" patient-care in contrast to hospitalization of oxygen-therapy patients, yielding several aspects of non-constancy of patient-demand in comparison to the sedentary and continually-uniform (relatively at least) conditions of a hospital.

6. The "plumbing" or hardware, both rigid and flexible, of oxygen-supply systems is, for both economy and low-weight especially in "walk-around" systems, relatively light in weight and strength; and thus any non-used increase of gas pressure, as caused inevitably by the NER, can cause danger to the system and even to the patient, if not safely vented, quite desirably automatic.

7. Patients seem to be prone to a desire to give themselves an over-supply of oxygen if the supply is not effectively maximized; and this has long been realized as a danger of oxygen therapy, such a danger that for years physicians would require hospitalization for oxygen-therapy to minimize change of overdose.

8. The expense of oxygen, and the limitation of patient-freedom as caused by a need of conservation of the liquid oxygen supply and need of replenishment of the stored oxygen reserve, give a corresponding desire that the safety venting be automatically stopped when not needed for safety.

9. Automaticness and foolproofness of all the flow-regulation incidentals, as to all of the factors indicated in the above summary, as well as a desire for minimal maintenance, are particularly important, for patient well-being, economy of oxygen, and economy of the equipment.

COMPONENTS OF THE INVENTION

The present invention includes a discovery that two prior art devices, one of which may be used as in the prior art, and the other by relatively small although significant modifications of its use in the prior art, may be advantageously combined into a novel and particularly advantageous combination, that combination giving what may be considered as a synergistic effect as to accomplishment of all the needs summarized above, all as explained herein.

The devices are (a) a lockable flow-adjustment valve shown in a prior art patent, that being the U.S. Pat. No. 4,140,297, issued Feb. 20, 1979 to Ray V. Bussell, entitled "Lockage Regulatory Valve" and (b) a modification of an economizer valve shown in the pending U.S. patent application Ser. No. 06/855/738, of the present inventor William Carter, filed Apr. 25, 1986 and entitled "Economizer/Relief Valve for Oxygen Dispensing System".

Both of those prior art devices are fully shown in the enclosed drawings and the description given herein, although the entirety of the said Bussell U.S. Pat. No. 4,140,297 is incorporated herein by reference as fully as if set forth in complete detail.

The said Bussell U.S. Patent device provides a lockable (although adjustable) flow-metering valve, and the modified economizer valve of the Carter U.S. patent application provides automatically a safety venting and an automatic non-venting as indicated herein as advantageous.

THE COMBINATION CONCEPTS, IN SUMMARY

The combination provides the following two components, in an advantageous and novel combination:

(a) The Bussell flow-metering device of his U.S. Pat. No. 4,140,297 provides a lockable means by which, although the factory or distributor can pre-set a maximum flow-rate according to the physician's prescription, the patient can easily adjust the flow rate downwardly through increments, as low as the patient desires, even to a zero or "OFF" flow rate.

(b) The Carter pending U.S. patent application Ser. No. 06/855,738 provides an economizer valve which automatically relates and adjusts the dispensing line condition to whatever is the relation at the time, of the NER of the liquid storage system, and the usage dispensed to the patient, either venting or non-venting the NER production of oxygen gas and pressure to maintain pressure within safe limits as per the adjustment of the unit's relief valve. The economizer here used is only slightly modified from that of the Carter application.

These two cooperating components, both more fully described herein as to the embodiment illustrated in the drawings, are provided in an unified or integrated, single-body device by means of which all the significant factors of gaseous oxygen dispensing are provided and/or regulated, i.e., providing adjustable flow rate, lockable maximum flow rate, and venting or non-venting of excess oxygen according to the usage and whatever is the NER of the cryogenic liquid storage system, thus providing safety and of both the patient and equipment, economy of venting only when necessary, and achieving automatic adjustment to variations in gas usage and of ambient conditions, all in a small, compact, unitary light-weight device which is scarecely noticable as a device of oxygen supply installation, useful in most all oxygen supply applications but particularly advantageous to provide both "at home" convalescence and "walk-around" portability, all to the great favor of the patient needing the oxygen therapy.

The above description is of an introductory and generalized nature, particularly to mention the general objects and achievements and desirability of the present invention, and to indicate the combination nature of the inventive concepts, and the background and long-felt need of a satisfactory lockable valve device particularly in combination with an economizer valve, all as quite desirable and advantageous in oxygen-dispensing therapy.

More particular and specific concepts, features, and details are set forth in the following more detailed description of an embodiment illustrative of the invention's concepts, taken in conjunction with the accompanying drawings.

BRIEF DESCRIPTION OF THE DRAWINGS

In the drawings, which are somewhat schematic and diagrammatic in nature, it will be noted as follows.

DETAILED DESCRIPTION OF THE ILLUSTRATIVE EMBODIMENT

Figure 3:
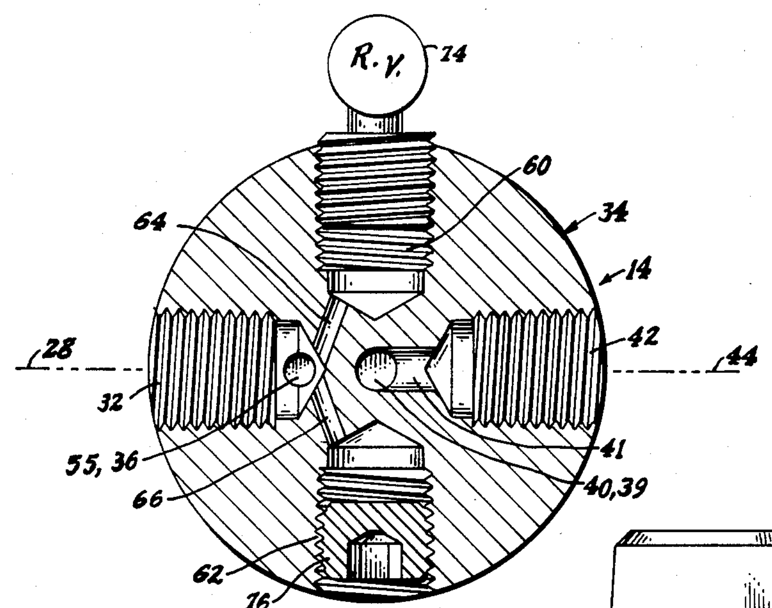
FIG. 3 is a cross-sectional view through the economizer valve, it being generally shown as taken by Section-line 3—3 of FIG. 2.

As shown in the drawings, the present invention provides a combination device 10 which, summarily stated, provides both a flow selector 12 and an economizer valve 14.

As stated above, each of the components 12 and 14 are, respectively, substantially that as shown in the prior patent of Ray V. Bussell (U.S. Pat. No. 4,140,297), and the pending U.S. patent application of William Carter (Ser. No. 06/855,738); and, accordingly, inventive claim is not here made to either except as features thereof are incorporated herein in combination which here provides a new and advantageous device with new and advantageous results.

More particularly, the combination of the present invention provides a combination device 10 by which critically-metered amounts of gaseous oxygen are dispensed or delivered to a patient who is being administered oxygen in his medical therapy, the combination 10 assuring that advantageous utility better than either of those components separately, a specially-desired medical effect which is of vital need in oxygen therapy, due to the critical volumetric aspect of oxygen therapy, and the wrong desire of patients to give themselves what might be realistically called an overdose; for indeed an overdose of oxygen is harmful, and is a reason why many physicians require hospitalization of patients undergoing oxygen therapy.

In the administration of therapeutic oxygen, in a dispensing system 16, a reservoir or storage chamber 18 will be assumed to have been supplied with liquid oxygen 20; and above the liquid 20 in the chamber 18 there is gaseous oxygen in what is referred to as the ullage 22 portion, i.e., the gaseous portion above the liquid 20.

Oxygen in its liquid storage state is of course a cryogenic liquid, and accordingly the storage chamber 18 is of an insulated-wall nature, but since the walls 24 of the storage chamber 18 are not of perfect insulation nature, heat 26 enters into the chamber 18 and continually causes a boiling of the liquid oxygen 20 at a slow rate, called the "normal evaporation rate" or simply "NER"; and thus the dispensing line 28, containing a warmup coil means 30, is under a constant pressure due to the NER of the supply of liquid oxygen 20 in the storage container 18.

The dispensing line 28 from the liquid oxygen container 18 is shown as connected to an inlet port 32 of a body member 34; and that inlet port 32 through a passage 36 leads to a non-central area of the diaphragm 38 of the economizer valve 14.

The central area of the diaphragm 38 is in valving-closable registration with the outlet 39 of a passage 40 centrally of body member 34 which leads (via passage 41) from an inlet port 42 of body member 34; and the inlet port 42 is in communication with a branch line 44 which through a warmup coil 46 is in communication with the liquid oxygen 20 in the storage tank 18.

The open inlet 48 of branch line 44 is adjacent the bottom 50 of the storage tank 18 so as to be immersed in liquid oxygen 20, although the warmup coil 46 assures that the gaseous oxygen coming from line 44 to inlet port 42 will be sufficiently warmed for use as specified herein. (The pressure in line 44 will be over atmospheric, substantially that of the ullage portion 22 of reservoir 18 and the line 28 leading from the ullage 22, considering the heat input 26 providing NER, and the heat input at the warmup coil 46.)

The diaphgram 38 is the diaphragm of an economizer valve of the Carter application, and it is spring-urged by a spring 52 toward closure against the valve-seat 54 of the body member 34.

It will be noted that the valve-seat 54 which contains the outlet 39 of passage 40 of the line 44 (44/46/42/41/40/39) is offset toward diaphragm 38 in comparison to the oulet 55 of passage 36 of the line 28 (28/30/32/36/55); and thus the line 36 will be open for the NER-caused gas flow to keep the diaphragm 38 off the valve seat 54 of outlet 39 and passage 40 (thus keeping opening 39 and the passage 40 open) regardless of the condition of flow or no-flow in line 44.

The inlet 42 from the warmed gas line 44 communicates (via passage 41) with a passage 56 provided in the body member 34, the passage 41 being in parallel with the passage 40 of body member 34; and it is the passage 56 through passage 57 which leads to the flow selector valve 12, through an outlet port 58; but before describing the overall operativity, it is noted that the body member 34 is also shown provided with a plug 59 closing the outer end of passage 57, and, noticing FIG. 3, the body member 34 is also shown as provided with additional ports 60 and 62 which are connected in parallel with the port 32 by passages 64 and 66, respectively.

As to operativity, it depends as now shown upon the condition of use, i.e., the rate of gaseous oxygen to be dispensed, that rate being that as regulated by the setting of the flow selector valve 12; and in the consideration of operativity, it may be helpful to recall that the body port 32 delivers gaseous oxygen from the gaseous ullage 22, hence the line 28 and port 32 may here be called the "gas" line 28 and "gas" port 32, whereas the port 42 delivers gaseous oxygen from the line 44 whose inlet 48 is immersed in the liquid oxygen 20, and thus the line 44 and port 42 may be for contrast called the "liquid" line 44 and "liquid" port 42, even though the line 44 will have gas rather than liquid in its section downstream of the warmup coil 46 including of course the inlet 42 of body member 34 and all portions further downstream.

Also, it is to be noted that the spring force of spring 52 is adjustable by the outer end of the spring 52 bottoming against a wall 67 of body member 34 which, by a threaded connection 68 to cylindrical body member 69, is movable in and out. (This will be a factory or distributor's adjustment, to account for variations of manufacturing, spring strength, etc., rather than an adjustment by the patient; and the adjustment will desirably be fixed, as by glue.)

The body member 69, by screw connection 70 to the body member 34, also acts through O-ring 71 to clamp the periphery of the diaphragm 38 against a circular seat 71*a* of body member 34.

With that in mind, it is helpful to consider the various conditions of dispensing, as now specified:

(a) a Condition I in which the flow rate of gaseous oxygen from the dispensing outlet 72 of the flow selector 12 is more than the NER (rate of evaporation) of liquid oxygen 20 in the supply chamber 18, that NER being caused as mentioned above by heat 26 entering the storage reservoir 18;

(b) a Condition II in which the flow rate of gaseous oxygen from the dispensing outlet 72 is the same as the NER (rate of evaporation) of liquid oxygen 20 in the supply chamber 18;

(c) a Condition III in which the flow rate of gaseous oxygen from the dispensing outlet 72 is less than the NER (rate of evaporation) of liquid oxygen 20 in the supply chamber 18 although not zero; and (d) a Condition IV in which the flow rate of gaseous oxygen from the dispensing outlet 72 is zero, this being merely a condition of standby or readiness but no use.

In use of a system 16 containing the flow selector 12 and the economizer valve 14, the operativity of the economizer valve 14 with its diaphragm 38, its spring means 52 and passageways 36 and 40/58 is as follows, depending upon which of the above-specified Conditions I–IV is then existing:

(e) In Condition I (FIG. 2), of more use or demand than the NER, the diaphragm 38 of the economizer valve 14 will be open by the pressure caused by the NER, i.e., the evaportion of the liquid oxygen 20 in the supply chamber 18, and the pressure in the outlet passageway 56 being over that of atmospheric pressure as due to pressure in the line 44 and thus acting in a valve-opening manner against the diaphragm 38; and the open-valve condition of the diaphragm 38 thus permits the NER gas production in gas line 28 to flow from line 28 and its inlet gas port 32 and body passage 36 past the valve seat 54, and via port 39 and passage 40 to outlet port 58 and on to the flow selector 12 for patient-use, in contrast to venting as in other Conditions III and IV mentioned herein.

No gas will be vented out the relief valve 74 shown in port 60 in this Condition 1, because the relief valve 74, it is to be understood, will be set to vent (from gas port 32, passage 64, and port 60) at a safe pressure which is higher than that existing in passages 40 and 56 when the flow selector 12 is permitting gas flow out its outlet 72 more than that caused by the NER causing flow through line 28. In this Condition I the demand or usage of oxygen (out passage 56 and flow selector 12's outlet 72) is made up by the gas flowing in line 28 caused by NER pressure, with the balance from line 44.

Thus it is to be noted that the economizer function of the economizer valve 14 is characterized by its operativity.

That is, although the economizer valve 14 permits safe venting via relief valve 74 when the oxygen gas pressure as caused by the NER would exceed that of the use or demand from the flow selector 12's outlet 72, and at that condition it permits venting at 74 whatever is the excess gaseous oxygen over the use or demand, nevertheless, whenever the use or demand of gaseous oxygen out the flow selector 12's outlet 72 utilizes as much as or more than the NER produces in the reservoir ullage 22, the economizer valve 14 provides that there is no such venting. (This is further to be understood in considering the operativity in the various Conditions of use, here discussed.)

Thus in Condition I, the open-valve condition of diaphragm 38 provides that the economizer valve 14 serves with economizer function, due to its use of the NER oxygen production rather than venting of the oxygen through the relief valve means 74, showns as carried in body port 60 for relief-venting in Conditions of lesser use.

(f) In Condition II (FIG. 2), with flow rate out the flow selector 12's outlet 72 being that of the NER, the economizer valve means 14's diaphragm 38 will be off the valve seat 54, thus in valve-open condition by the pressure caused by evaporation of the liquid oxygen 20 (NER) in the supply chamber 18, and, as in Condition I, the pressure in the liquid line 44 and outlet passageway 56 being over that of atmospheric pressure, and thus acting in a valve-opening manner against the diaphragm 38; and as in Condition I the NER oxygen production will flow past valve seat 54 and out the outlet passage 56–58 to the flow selector 12 for patient-use, thus providing that the economizer valve 14 again serves an economizer function due to patient-use instead of venting of oxygen through the relief valve 74. This is thus a condition similar to that of Condition I even though now no gas is being dispensed from the liquid line 44 and the body inlet port 42.

(g) In Condition III (FIG. 2), of less use than the NER, the economizer valve means 14 will be open (diaphragm 38 off valve seat 54) by the pressure caused by the NER evaporation of the liquid oxygen 20 in the supply chamber 18, and, again as in Conditions I and II, helped by the pressure in the liquid line 44 being over that of atmospheric pressure, and thus acting in a valve-opening manner against the diaphragm 38.

However, with the outlet 72 of flow selector 12 permitting less gas flow than even the NER oxygen production, the valve-open condition of diaphragm 38 permits the venting through relief valve 74 the difference between the amount of gaseous oxygen caused to flow into the inlet dispensing lines 28 and 44, as caused by the NER evaporation of liquid oxygen 20 in the supply chamber 18 and the warmup coils 30 and 46, and the flow of gaseous oxygen dispensed through the dispensing outlet 72 of the flow selector 12, thus providing that the economizer valve 14 serves to permit the venting of oxygen through the relief valve 74, whenever demand out the selector 12's outlet 72 is less than the gas production caused by the NER. This is the condition even though no gas is being dispensed from the branch line 44, since not even all NER oxygen production is being used but is being vented out relief 74.

(h) In Condition IV (FIG. 2), the readiness standby or no-use condition, the economizer valve means will be open by diaphragm 38 being off the valve seat 54, although no flow is through the outlet passageway 56, for the same reasons as in Condition III, and the relief valve 74 will be merely venting excess gaseous oxygen pressure as more heat 26 enters the supply chamber 18 causing the NER evaporation of the liquid oxygen 20, maintaining the pressure of gaseous oxygen in the relief passageway 64 at no more than the setting of the relief valve 74 to provide its pressure-relief function, regardless of the amount of pressure caused by evaporation of liquid oxygen 20 in the supply chamber 18 and caused by heat input in the lines 28 and 44 and their warmup coils 30 and 46.

The body port 62 and its body passage 66 of the disclosed embodiment are shown as merely plugged by a plug 76 in port 62, although in some instances the port 62 may be used to carry some secondary relief valve means not here considered.

Turning now to the flow selector component 12, used here from the Bussell U.S. Pat. No. 4,140,297, it will be noted that it uses a metering mechanism such as an "Essex" valve 82, the Essex valve 82 shown in the Bussell patent being that of Essex Cryogenics, of St. Louis, Mo., PN 0350380100-1.

Figure 1:
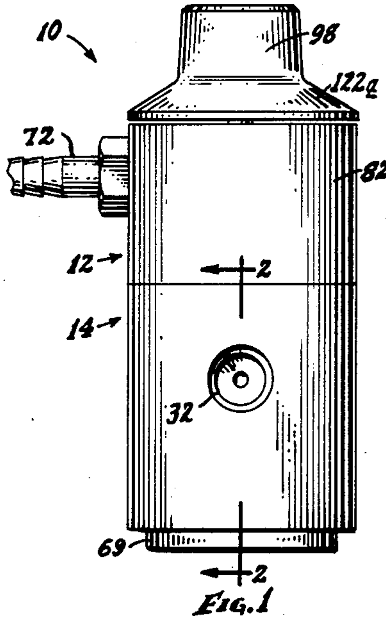
FIG. 1 is an elevation view of a combination device of the present invention, providing a lockable flow selector and an economizer valve.
Figure 2:
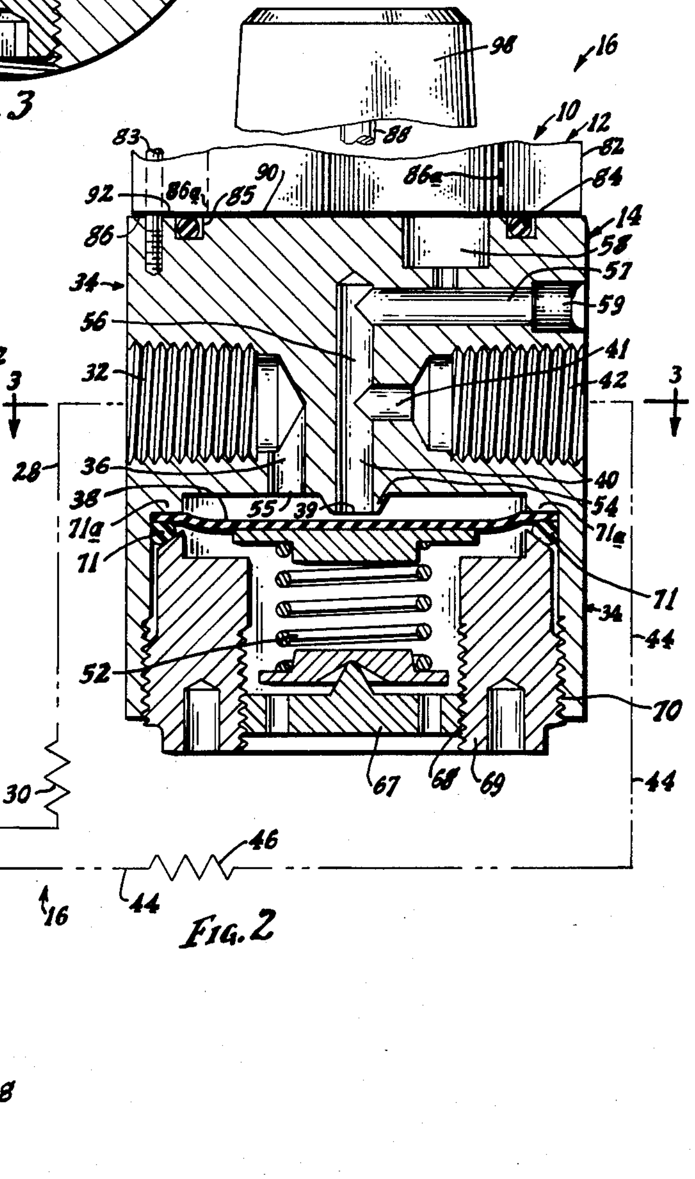
FIG. 2, in larger scale, except that the container for the liquid oxygen reservoir and the piping therefrom are merely schematic, shows the device of FIG. 1, the economizer valve being shown in vertical cross-section generally as taken by Section-line 2—2 of FIG. 1.
Figure 4:
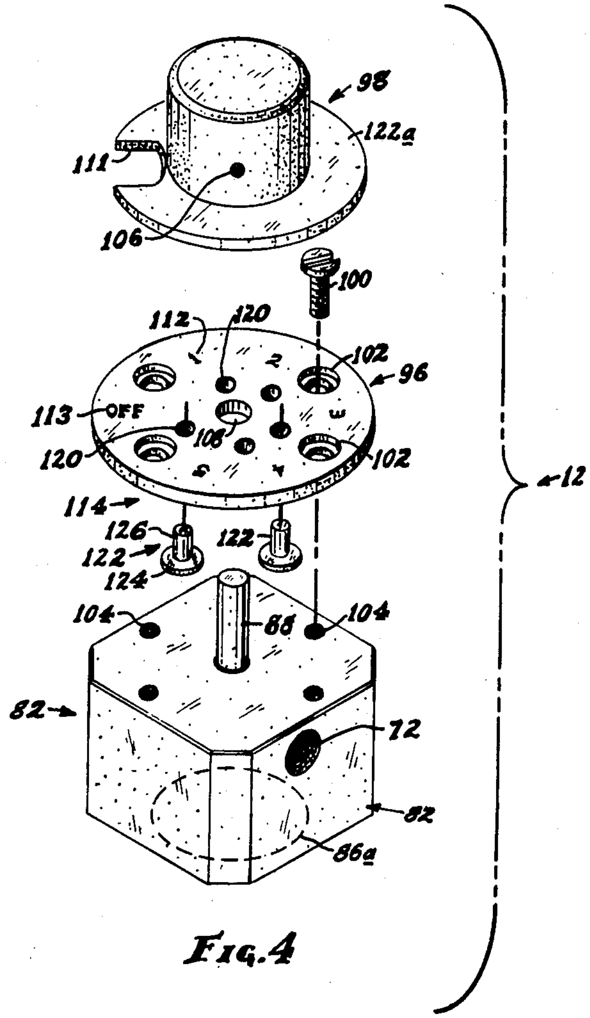
FIG. 4 is an exploded pictorial view of a lockable valve device of the lockable regulatory valve.
Figure 5:
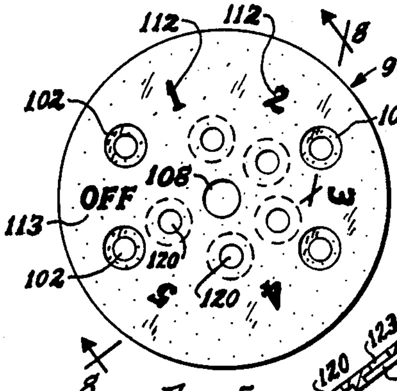
FIG. 5 is a plan view of the flow lock and indicator plate shown in FIG. 4.
Figure 8:
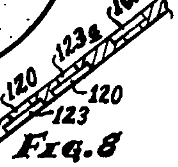
FIG. 8 is a fragmental cross-sectional view through the lock plate of FIGS. 4 and 5, taken generally as indicated by Section-line 8—8 of FIG. 5.
Figure 6:
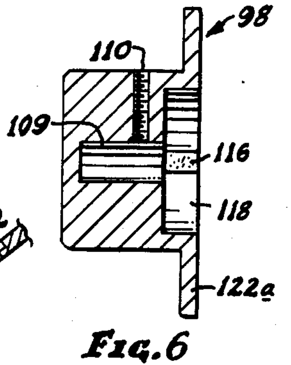
FIG. 6 is a cross-sectional view of the control knob shown in FIG. 4, this view being generally as taken by Section-line 6—6 of FIG. 7.
Figure 7:
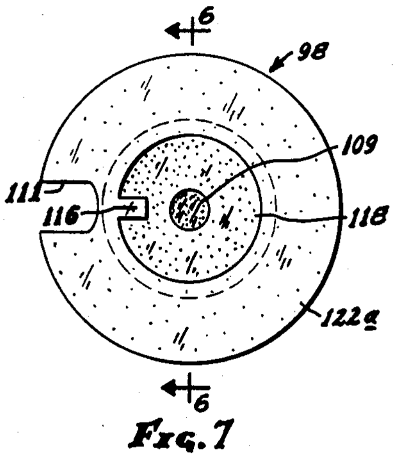
FIG. 7 is a bottom view of the control knob of FIGS. 4 and 6.

The Essex valve 82, shown as having an exterior shape generally of cylindrical shape in FIGS. 1 and 2, although generally of a cube-like shape in FIG. 4, is shown in FIGS. 1 and 2 as mounted atop the economizer valve 14, and is held thereto by bolts 83. That connection as shown is airtight by an O-ring 84 as a sealing means carried in a circular recess 85 in the top face 86 of the economizer valve 14 near the periphery thereof, and outside of the flow-regulating valve 12's inlet means schematically shown at **86*a***.

The interior of the Essex valve 82 is not shown, for it forms no part of the inventive concepts here; but its gas-flow control shaft 88 is shown extending upwardly from the Essex valve body 82, for flow-control specified further herein.

Gas-flow interiorly of the Essex valve 82 is through metering means (not shown) whose inlet means **86*a* opens to the circular zone or space 90 within the body of the O-ring 84, between the adjacent lower face 92 of the Essex valve 82 and the upper face 86 of the economizer valve, which space 90 is open to the economizer valve 14's outlet port 58 which is at the upper end of the economizer valve 14 and which opens onto the upper economizer valve face 86 and the inlet means 86*a*, they being juxtaposed within the limits of the O-ring 84**.

The Essex valve 82 also provides a flow-indicator plate which is in the Bussell patent replaced by a flow lock indicator plate 96, as hereinafter described more fully, and also a control knob which is herein replaced by a control knob 98, also as hereinafter described.

Screws or bolts 100 (four in this embodiment) hold the indicator plate 96 to the Essex valve 82 by passing through shouldered openings 102 in the plate 96 and into threaded openings 104 in the Essex valve's body 82; and a set-screw 106 holds the knob 98 to the shaft 88.

The indicator plate 96 has a central opening 108 through which the control shaft 88 extends, that shaft 88 extending into a bore 109 of the cap or knob 98, where the shaft 88 is tightly engaged by the knob's set screw 106 threaded into the knob's radially-extending threaded hole 110.

The cap 98 is provided with an opening 111, by which the user can see the numerals 112 or "OFF" phrase 113, to see what the flow rate is, those being on the plate 96.

As stated in the Bussell patent, as so far described in this numerical description, the metering mechanism is the above-designated Essex oxygen valve 82, and as such forms no part of the present invention, being shown and described as background as mentioned above, and as a basis for the flow-metering locking and adjustability-concealing concepts of the Bussell patent which is herein used in a novel and advantageous combination with the Carter economizer valve 14. In this combination, the Bussell invention provides a new and advantageous adjustable flowmeter regulatory valve lockability device 10 for locking the associated rotary valve 82 into a fixed maximum flow-rate setting or position.

According to concepts of the Bussell invention, there is provided a flow lock type of indicator means or plate 96 fixed to the associated valve 82; and there are provided what is here referred to as first adjustable means 114, hereinafter described, which provide the valve-locking feature, and which are adjustably fixed to the associated valve body 82 or in this embodiment to its flow lock indicator plate 96 which is fixed to the valve body 82.

It is particularly to be noted that the said first adjustment means 114 are of a type different from the adjustment means which are provided by the valve's rotational control shaft 88.

That is, the adjustment provided by control shaft 88 is simply a rotation of the shaft 88, by rotating the control knob 98, purposefully easy for the user to do, and with no tools or special know-how at all.

However, quite in contrast, the said first adjustable means 114 which are fixedly settable or positionable to accommodate rotation of the rotary valve's rotational control shaft 88 through only its movement up to that in which a specific maximum flow-rate is permitted, and which permits adjustability to a lesser but not higher flow-rate or rates by rotation of the knob 98 and thus also the valve's control shaft 88, are made such as to be quite concealed and to need tools and require significantly more know-how; and thus the user cannot readily perceive how to conveniently change the maximum setting of the oxygen flow-rate.

More particularly, the said first adjustment means 114 are adjustable to vary the maximum permitted flow-rate only by at least removal of the control knob 98 off the valve's rotary control shaft 88, or only by at least removal of the flow lock indicator plate 96, or, in the illustrated embodiment, by removal of both of the control knob 98 of the valve's rotary control shaft 88 and also of the flow lock indicator plate 96.

It is noted, as hereinafter detailed, that the first adjustment means 114 is carried by the flow-rate lock plate 96 itself, that is, the plate which is fixed to the valve body 82 and which is provided with numerals 112 or other indicia including the "OFF" phrase 113 to indicate the flow-rate. This provides economy and simplicity, by providing that the plate 96 provides the double function of an indicator plate and a flow-rate lock component.

For association with the plate's lock means 114, there is provided an associated rotatable abutment means carried by the valve's control shaft 88 or knob 98, here shown as an abutment 116 which extends inwardly into a large bore 118 at the lower end of the control knob 98 for a purpose now to be made apparent.

In the illustrated embodiment, the said first adjustment means 114 are fixedly held relative to the associated valve 82 by the said flow lock plate 96 being assembled (by screws 100) onto the Essex valve body 82.

More particularly as shown, the said first adjustment means 114 are provided by providing openings 120 in the flow lock indicator plate 96 and by providing abutment pins 122 which are adjustably inserted in selected ones of the said plate-openings 120; and those pins 122 are abuttingly engageable by the associated rotatable abutment means here shown as the cap lug 116, but concealed by cap-flange 122a.

It will be seen that in the illustrative embodiment the control knob 98 effectively conceals both the rotatable abutment 116 and fixed abutments 122, concealing effectively the entirety of the maximum-flow adjustability features, and, further, that the abutment pins 122 are fixedly held relative to the associated valve 82 by the said flow lock indicator plate 96 being assembled onto the said associated valve's body member 82, thus not only achieving some economy and double-function of the knob 98 and indicator plate 96, but assuring that disassembly must include that of the plate 96 before the maximum flow-rate can be altered.

In the illustrated embodiment, the said openings 120 in the flow lock plate 96 are of shouldered nature, in which the hole-portion 123 adjacent the associated valve body member 82 is of larger diameter than the hole-portion 123a adjacent the control knob 98; and the abutment pins 122 are headed shaft-like members whose heads 124 are received in the respective hole's larger-diameter portion, and the shaft portions 126 of the pins extend through the respective hole's smaller-diameter portion and outwardly of the flow lock plate 96 for abutting engagement with the movable (rotatable) abutment means 116 shown here as carried by the valve's control knob 98.

It will be noted that FIG. 4 illustrates a setting of the two pins 122 to provide a maximum flow-rate designated by the numeral "3", that is, the control shaft 88 can be turned only between the "OFF" position and the "3" position, due to abutment with the two pins 122 by one or the other of the side-faces of the rotatable knob-lug 116. For the "5" position, only a single pin 122 need be used; but for the other positions of maximum pre-set flow-rate, the pin 122 shown at the right in FIG. 4 would be inserted into whatever other plate-opening 120 is desired.

SUMMARY

It is thus seen that this combination device, with novel means of joint usage of prior art components into a unitary combination device installable in a cryogenic gas supply line particularly beneficial in oxygen therapy, and providing advantageous control in both components, all as provided according to the inventive concepts, provides a desired and advantageous device yielding the advantages for a cryogenic gas supply system, particularly advantageous for patients needing oxygen therapy. Each of the components achieves in this novel combination a significant advantage not achieved by any single prior art device even though the prior art had had the components and their concepts inidividually although not in the novel combination here achieved.

Accordingly, it will thus be seen from the foregoing description of the invention's concepts, according to this illustrative embodiment, considered with the accompanying drawings, that the present invention provides new and useful concepts as to components particularly in combination with each other, which provide and achieve a novel and advantageous combination providing in a unitary body several gas-control features, having desired characteristics, with high advantages of convenience, ease of operativity control, etc., yielding desired advantages and characteristics, and accomplishing the intended objects, including those hereinbefore pointed out and others which are inherent in the invention.

Modification and variations may be effected without departing from the scope of the novel concepts of the invention; accordingly, the invention is not limited to the specific embodiment of either component or form or arrangement of parts herein described or shown.

I claim:

1. A combination regulatory valve for a dispensing system for dispensing gas from a cryogenic liquid supply source comprising, in combination, an economizer valve which provides a safety venting of excess pressure in the dispensing system when the usage of the gas is less than that being produced by the evaporation of the cryogenic liquid, but which economically does not vent when the usage of the gas is sufficient to keep the pressure in the dispensing system sufficiently low, the economizer valve having inlet means for receiving gas from the cryogenic liquid supply source, a vent means for venting excess pressure, and outlet means for delivery of the non-vented gas received through the inlet means, in combination with a flow-regulatory valve having an inlet means and an outlet means, and flow-metering means of a plurality of types, a first one of which types adjustably provides a selection of a variety of optionally selectable flow rates, and a second of which types adjustably safely limits the option selectable by the said first type to being that or less than that provided by the second type, the said flow-metering means of the two types being adjustable by different means, and means interconnecting the economizer valve and the flow-regulatory valve, for delivery of the gas from the outlet means of the economizer valve to the inlet means of the flow-regulatory valve, the combination providing for a cryogenic system the economy of the economizer valve as to safety venting or economical non-venting depending on the aforesaid relation of gas usage and gas production, with safety limited dispensing of the gas even though there is provided an optional selectability of gas usage by the first flow-metering type up to that selected by the second flow-metering type, and providing that the gas usage as per the flow-regulatory valve's first metering type, as restricted by its second metering type, controls the venting and non-venting of excess gas pressure by the economizer valve.

2. The invention as set forth in claim 1, in a combination in which there is provided connection means for interconnecting the economizer valve and the flow-regulatory valve, providing both a mechanical connection of the economizer valve and the flow-regulatory valve and an airtight interconnection of the outlet means of the economizer valve with the inlet means of the flow-regulatory valve.

3. The invention as set forth in claim 1, in a combination in which the economizer valve and flow-regulatory valve each have an opening means facing to to an outer wall thereof, the opening means of the economizer valve being its outlet means and the opening means of the flow-regulatory valve being its inlet means, there being connection means which interconnect the economizer valve and flow-regulatory valve, with the economizer valve's outlet means and the flow-regulating valve's inlet means being in a general juxtaposition, and with sealing means provided which provide an airtight seal exteriorly of the economizer valve's outlet means and the flow-regulatory valve's inlet means, and assuring that all gas dispensed from the economizer valve's outlet means enters the inlet means of the flow-regulatory valve.

* * * * *

UNITED STATES PATENT AND TRADEMARK OFFICE

CERTIFICATE OF CORRECTION

PATENT NO. : 4,664,146

DATED : May 12, 1987

INVENTOR(S) : William Carter

It is certified that error appears in the above-identified patent and that said Letters Patent is hereby corrected as shown below:

Col. 2, line 22 The word "change" should be "chance".

Col. 2, line 51 The word "Lockage" should be "Lockable".

Col. 3, line 36 The word "scarecely" should be "scarcely".

Col. 7, line 36 The word "showns" should be "shown".

Col. 10, line 66 The word "Modification" should be -- Modifications --.

Signed and Sealed this

Fifteenth Day of September, 1987

*Attest:*

DONALD J. QUIGG

*Attesting Officer* *Commissioner of Patents and Trademarks*